US012695601B2

(12) United States Patent
Chattopadhyay et al.

(10) Patent No.: US 12,695,601 B2
(45) Date of Patent: Jul. 28, 2026

(54) PAYLOAD LEVEL ENCRYPTION

(71) Applicant: Capital One Services, LLC, McLean, VA (US)

(72) Inventors: Raja Chattopadhyay, Glen Allen, VA (US); Santhosh Kumar Kuppuraj, Glen Allen, VA (US); Thiagarajan Subramanian, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 193 days.

(21) Appl. No.: 18/624,862

(22) Filed: Apr. 2, 2024

(65) Prior Publication Data

US 2025/0310086 A1 Oct. 2, 2025

(51) Int. Cl.
H04L 9/08 (2006.01)
H04L 9/16 (2006.01)
(52) U.S. Cl.
CPC .......... H04L 9/0825 (2013.01); H04L 9/0891 (2013.01); H04L 9/16 (2013.01)
(58) Field of Classification Search
CPC ........ H04L 9/0825; H04L 9/0891; H04L 9/16
See application file for complete search history.

(56) References Cited

U.S. PATENT DOCUMENTS

| | | | |
|---|---|---|---|
| 7,802,096 B1 * | 9/2010 | Matthews | H04L 9/0822 |
| | | | 713/165 |
| 8,555,344 B1 * | 10/2013 | Wiedmann | H04L 63/0876 |
| | | | 713/168 |
| 10,003,584 B1 * | 6/2018 | Roth | H04L 63/068 |
| 2019/0043339 A1 * | 2/2019 | Bernal | G08B 13/14 |
| 2021/0092603 A1 * | 3/2021 | Yang | H04L 9/0844 |

* cited by examiner

*Primary Examiner* — William S Powers
(74) *Attorney, Agent, or Firm* — Harrity & Harrity, LLP

(57) ABSTRACT

In some implementations, a system may configure a set of compliance requirements for a secure communication service. The system may configure a key rotation component and a key fallback component. The system may store a key, generated by the key rotation component, using a key store. The system may periodically update, using the key rotation component, the key in the key store in accordance with the set of compliance requirements. The system may maintain, in connection with periodically updating the key, at least one fallback key using the key fallback component. The system may receive a request for a communication using the key. The system may determine whether the key is a valid current key or a valid fallback key. The system may communicate using the key based on determining whether the key is the valid current key or the valid fallback key.

20 Claims, 5 Drawing Sheets

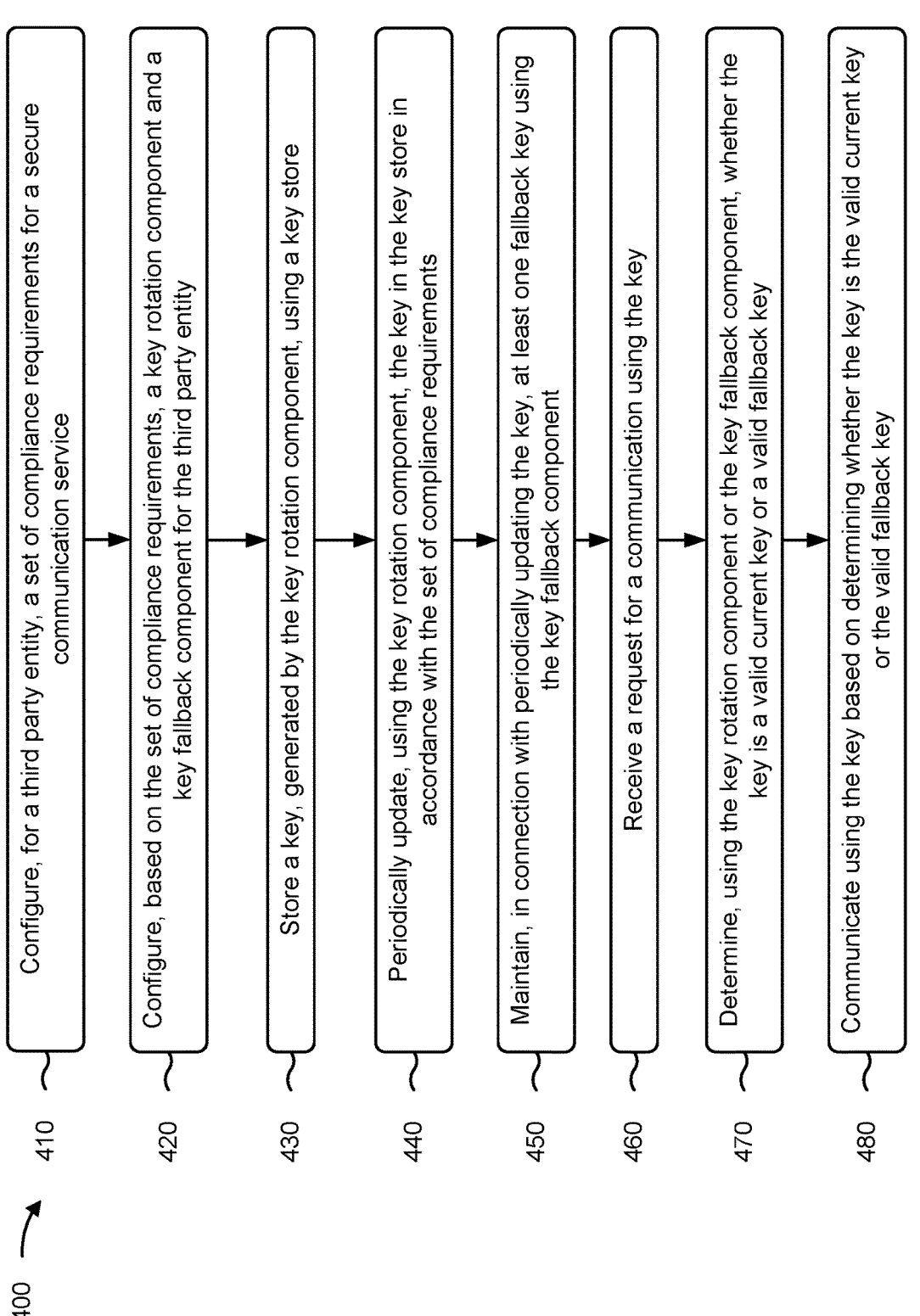

410 — Configure, for a third party entity, a set of compliance requirements for a secure communication service 420 — Configure, based on the set of compliance requirements, a key rotation component and a key fallback component for the third party entity 430 — Store a key, generated by the key rotation component, using a key store 440 — Periodically update, using the key rotation component, the key in the key store in accordance with the set of compliance requirements 450 — Maintain, in connection with periodically updating the key, at least one fallback key using the key fallback component 460 — Receive a request for a communication using the key 470 — Determine, using the key rotation component or the key fallback component, whether the key is a valid current key or a valid fallback key 480 — Communicate using the key based on determining whether the key is the valid current key or the valid fallback key

PAYLOAD LEVEL ENCRYPTION

BACKGROUND

A set of devices may use public-key cryptography for secure communications. In public-key cryptography, a first device may have access to a public key and a second device may have access to a corresponding private key. The first device may encrypt a communication using the public key, thereby generating an encrypted communication, and transmit the encrypted communication to the second device. The second device may use the corresponding private key to decrypt the encrypted communication, thereby enabling the second device to determine a content of the communication. In token-based authentication, a user may verify an identity and receive a unique access token. The token may enable the user to access a secure system without having to re-enter credentials each time the secure system is accessed.

SUMMARY

Some implementations described herein relate to a system for secure communication. The system may include one or more memories and one or more processors communicatively coupled to the one or more memories. The one or more processors may be configured to receive, from a client device of a third party entity, a request for secure communication service. The one or more processors may be configured to determine, for the third party entity and based on the request for secure communication service, a set of compliance requirements. The one or more processors may be configured to configure, for a third party entity and based on the set of compliance requirements, a key rotation component and a key fallback component. The one or more processors may be configured to transmit, to the client device, information identifying a key generated by the key rotation component. The one or more processors may be configured to periodically update, using the key rotation component, the key in accordance with the set of compliance requirements. The one or more processors may be configured to maintain, in connection with periodically updating the key, at least one fallback key using the key fallback component. The one or more processors may be configured to receive, from the client device, a request for a communication using the key. The one or more processors may be configured to determine, using the key rotation component and the key fallback component, whether the key is a valid current key or a valid fallback key. The one or more processors may be configured to communicate with the client device using the key based on determining whether the key is the valid current key or the valid fallback key.

Some implementations described herein relate to a method. The method may include configuring, by a system and for a third party entity, a set of compliance requirements for a secure communication service. The method may include configuring, by the system and based on the set of compliance requirements, a key rotation component and a key fallback component for the third party entity. The method may include storing, by the system, a key, generated by the key rotation component, using a key store. The method may include periodically updating, by the system and using the key rotation component, the key in the key store in accordance with the set of compliance requirements. The method may include maintaining, by the system and in connection with periodically updating the key, at least one fallback key using the key fallback component. The method may include receiving, by the system, a request for a communication using the key. The method may include determining, by the system and using the key rotation component or the key fallback component, whether the key is a valid current key or a valid fallback key. The method may include communicating, by the system, using the key based on determining whether the key is the valid current key or the valid fallback key.

Some implementations described herein relate to a non-transitory computer-readable medium that stores a set of instructions. The set of instructions, when executed by one or more processors of a system, may cause the system to receive, from a client device of a third party entity, a request for secure communication service. The set of instructions, when executed by one or more processors of the system, may cause the system to determine, for the third party entity and based on the request for secure communication service, a set of compliance requirements. The set of instructions, when executed by one or more processors of the system, may cause the system to configure, for a third party entity and based on the set of compliance requirements, key rotation for a first party public key/private key pair and a third party public key/private key pair. The set of instructions, when executed by one or more processors of the system, may cause the system to transmit, to the client device, information identifying a first party public key of the first party public key/private key pair. The set of instructions, when executed by one or more processors of the system, may cause the system to periodically update, using the key rotation, the first party public key/private key pair in accordance with the set of compliance requirements. The set of instructions, when executed by one or more processors of the system, may cause the system to maintain, in connection with periodically updating the first party public key/private key pair, at least one fallback key. The set of instructions, when executed by one or more processors of the system, may cause the system to receive, from the client device, a request for a communication using the first party public key/private key pair and the third party public key/private key pair. The set of instructions, when executed by one or more processors of the system, may cause the system to communicate with the client device using the first party public key/private key pair and the third party public key/private key pair.

BRIEF DESCRIPTION OF THE DRAWINGS

FIG. 4 is a flowchart of an example process associated with payload level encryption, in accordance with some embodiments of the present disclosure.

DETAILED DESCRIPTION

Figure 1A:
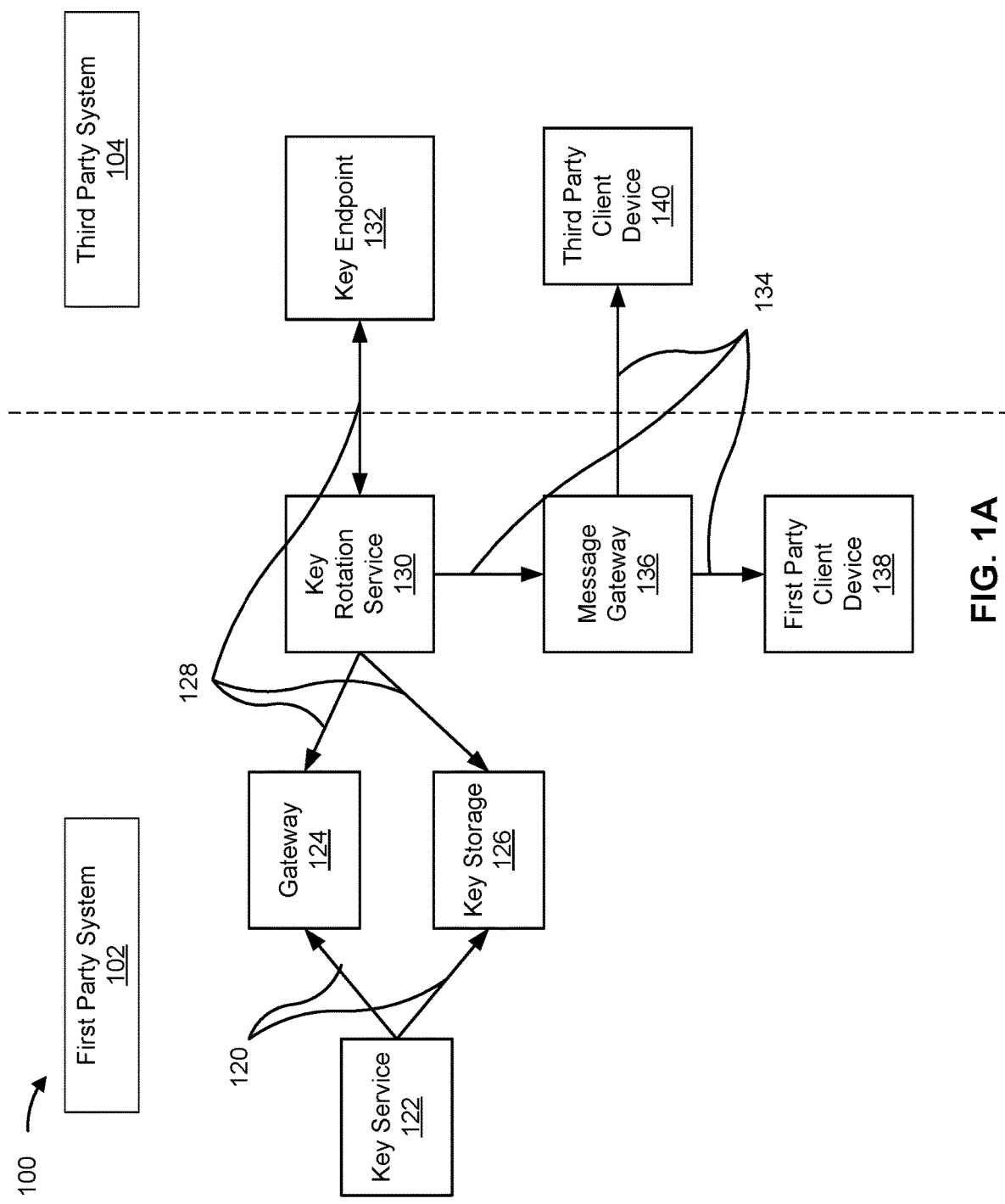
FIGS. 1A-1B are diagrams of an example implementation associated with payload level encryption, in accordance with some embodiments of the present disclosure.

The following detailed description of example implementations refers to the accompanying drawings. The same reference numbers in different drawings may identify the same or similar elements.

A set of devices may use a secure communication system for exchanging information without compromising information security. Some devices may implement a security standard or adhere to a security specification to ensure compliance with one or more security requirements. For example, the International Organization for Standardization (ISO) and the International Electrotechnical Commission (IEC) have established the ISO/IEC 27001 information security standard. Compliance with the ISO/IEC 27001 information security standard may include implementation of various information security management systems (ISMSs) as well as auditing of information security risk, design and implementation of information security controls, and/or adoption of information security management processes. Many other information security compliance requirements exist, which an organization may adhere to, such as Health Insurance Portability and Accountability Act (HIPAA) compliance (e.g., which relates to private health information), General Data Protection Regulation (GDPR) compliance (e.g., which relates to private user information), or California Consumer Privacy Act (CCPA) compliance (e.g., which relates to private user information), among other examples. Other examples of information types that may be subject to an information security policy include intellectual property information (e.g., trade secrets), security information (e.g., user names and passwords), or financial information, among other examples.

To satisfy one or more compliance requirements, an entity may establish information security controls for one or more computing devices or systems used by the entity. However, some computing devices or systems may interact with third party entities. For example, a financial entity (e.g., a first party) may include first systems or computing devices that interact with second systems or computing devices of a credit bureau (e.g., a third party). In another example, a healthcare management entity (e.g., a first party) may include first systems or computing devices that interact with second systems or computing devices of a billing entity or insurance entity (e.g., a third party). In yet another example, a manufacturing entity (e.g., a first party) may include first systems or computing devices (e.g., machine type communications (MTC) devices or connected manufacturing devices) that interact with second systems or computing devices of a maintenance entity (e.g., a third party, which performs remote maintenance or troubleshooting of factory equipment). Interaction with third party entities may result in exposure of private information in violation of a compliance requirement.

Some entities may establish field-level encryption to attempt to satisfy a compliance requirement. Field-level encryption may include encryption of individual fields within a payload (e.g., of a message) being encrypted. Field-level encryption may result in high levels of processing complexity to identify, encrypt, communicate, and decrypt information. Further, use of field-level encryption may result in increased response time associated with encryption of each pre-identified field and decryption of each pre-identified field. Additionally, field-level encryption may only cover pre-identified fields (e.g., known to contain sensitive data), and may fail to protect other sensitive data (e.g., in fields that were not pre-identified or in other parts of a message).

Some implementations described herein provide for message-level or payload-level encryption for external data sharing (XDS), such as data sharing with third party entities. For example, a secure communication service, which may be implemented at one or more client devices, servers, or systems, may enable encryption of a request and response payload. By performing message-level or payload-level encryption, the secure communication service may reduce an encryption complexity and response time relative to performing multiple field-level encryptions on pre-identified fields. Additionally, or alternatively, by performing message-level or payload-level encryption, the secure communication service may ensure that sensitive data present outside of pre-identified fields (e.g., in other fields or other portions of a message) is not exposed in violation of a compliance requirement. In this way, the secure communication service ensures satisfaction with one or more compliance requirements for an entity that interacts with third party systems.

Figure 1B:
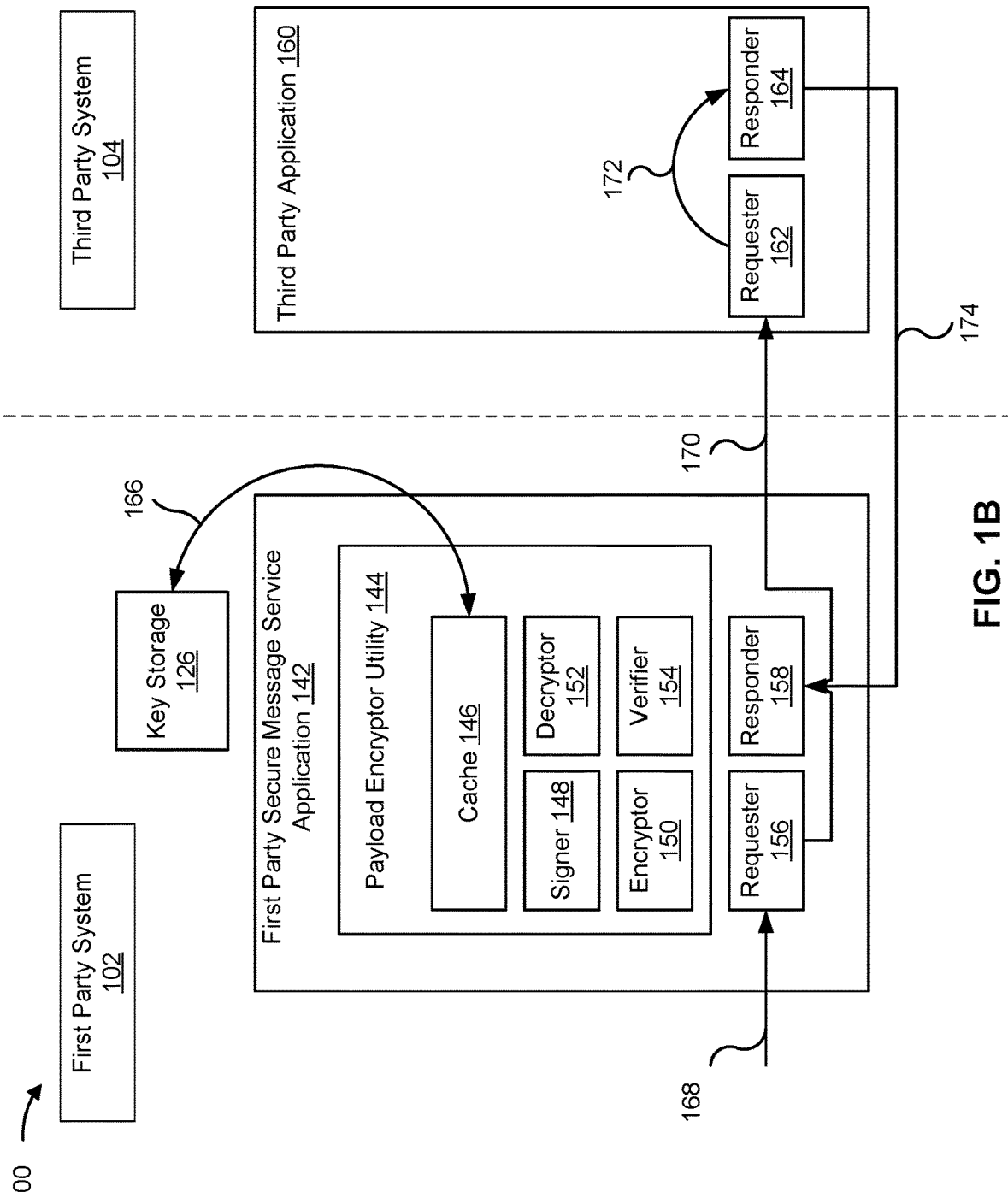

FIGS. 1A-1B are diagrams of an example implementation 100 associated with payload level encryption. As shown in FIG. 1A-1B, example implementation 100 includes a first party system 102 and a third party system 104.

As further shown in FIG. 1A, and by reference number 120, a key service 122, of the first party system 102, may generate and publish a set of keys. For example, the key service 122 may generate a public-private key pair (e.g., an asymmetric key pair set) and publish the public key (e.g., an external key) to a gateway 124 and store the private key in a key storage 126. The gateway 124 may make the public key available to client applications that are configured in connection with key creation. For example, in connection with generating the public-private key pair, the first party system 102 (or a device thereof) may configure a compliance policy, which may include a set of client applications that can access a public key to communicate with the first party system 102.

In some implementations, the gateway 124 may use an authentication token to verify a third party system 104 for access to a key. For example, the first party system 102 may onboard a third party system 104 for access to a secure communication service by authenticating the third party system 104 and providing an authentication token. In this case, the third party system 104 may use the authentication token to access the key gateway and obtain a key that can be used for communication with the first party system 102. Similarly, the third party system 104 may generate keys and transmit a notification to the first party system 102 to enable the first party system 102 to access keys generated by the third party system 104. In some implementations, the key service 122 may initiate onboarding of the third party system 104 (e.g., determination of a set of compliance requirements, as described below, and configuration of key rotation and key fallback) based on a request for secure communication. For example, the key service 122 may receive a request to onboard the third party system 104 for transmitting a secure message.

In some implementations, the first party system 102 may determine a compliance policy when onboarding a third party system 104 for access to an authentication token and secure communications using the secure communication service. For example, the first party system 102 may determine a set of key rotation parameters (e.g., how often to rotate keys, how long a key remains valid, a quantity of backup or fallback keys to use, or another parameter) and may configure communications and key generation in accordance with the set of key rotation parameters.

In some implementations, the key service 122 may generate one or more keys according to a configured set of parameters. For example, the key service may be configured with a particular key algorithm (e.g., Rivest-Shamir-Adleman (RSA) encryption), a particular key strength (e.g., a key size of a configured quantity of bytes), a key validity (e.g., how long a key remains valid), and/or a key rotation parameter (e.g., a frequency with which the key is rotated). In some implementations, the key service 122 may dynamically configure one or more parameters. For example, the key service 122 may analyze incoming data or outgoing data and dynamically select an encryption algorithm, from a set of possible encryption algorithms, based on a characteristic of the incoming data or the outgoing data. For example, when outgoing data is a first type associated with a first security level, the key service 122 may configure a first type of algorithm to use for encryption and, when the outgoing data is a second type associated with a second security level, the key service may configure a second type of algorithm to use for encryption. Additionally, or alternatively, the key service 122 may determine an amount of data or size of a dataset for communication and may select different algorithms for different amounts of data to ensure that latency associated with encryption and decryption does not exceed a configured threshold.

In some implementations, the key validity may be longer than the key rotation parameter. For example, the first party system 102 may configure a key to be rotated every 330 days, but be valid for 360 days. In this case, when a first key is rotated (and a second key is generated), the first key may continue to be used for 30 days after the second key is generated. In this case, the first key becomes a backup or fallback key for the second key. The cache 146 and/or the key storage 126 may maintain at least one fallback key to enable communications using the fallback key (or a corresponding fallback key of a keypair). By providing usage of a backup key or fallback key, the first party system 102 reduces a likelihood of communication interruption as a result of, for example, updating keys (and a latency associated with distributing updated keys and ensuring that each communicating client device is provisioned with a newest available key).

As further shown in FIG. 1A, and by reference number 128, a key rotation service 130, of the first party system 102, may attempt to fetch and distribute one or more keys and may determine if a key is rotated. For example, the key rotation service 130 is configured to fetch a first party public key of the first party system 102 and/or a third party public key of the third party system 104 and store the first party public key and/or the third party public key via the key storage 126. In this case, the key rotation service 130 is configured for periodic key fetching, such as key fetching according to a time-based schedule (e.g., once per week according to a configured schedule) or key fetching according to an event-based schedule (e.g., after a threshold quantity of uses of a key). The key rotation service 130 may attempt to obtain the third party public key from a key endpoint 132 of the third party system 104 (e.g., via a third party gateway). The key rotation service 130 may compare keys present in the key storage 126 and determine if a newly obtained key is a latest key compared with the keys present in the key storage 126. In other words, the key rotation service 130 determines if a newly obtained key has been rotated and, if so, replaces a stored key with a newly obtained key. In some implementations, the key rotation service 130 may onboard a new key (e.g., a currently configured key) with the third party system 104. In this case, the third party system 104 may rotate out a previously configured key, but may continue to store the previously configured key as a backup key until the previously configured key is no longer valid (e.g., based on an attribute of the previously configured key).

As further shown in FIG. 1A, and by reference number 134, the key rotation service 130 may transmit one or more notifications or alerts based on detecting an occurrence of a key rotation event (e.g., onboarding a new key and/or changing a current key to a fallback key). For example, the key rotation service 130 may transmit a notification to a message gateway 136 (e.g., of the first party system 102), which may distribute the notification to a first party client device 138 (e.g., of the first party system 102) and to one or more users of a third party client device 140 (e.g., of the third party system 104). In some implementations, the key rotation service 130 may publish a message to a notification service of the message gateway 136, such as a cloud notification service. For example, the key rotation service 130 may publish the message when a new key is available from the first party system 102 or the third party system 104. In this case, the notification may include information identifying which key has been rotated or a set of attributes associated with the key (e.g., which applications have access to the key, which the message gateway 136 may use to route the notification to a configured set of client devices). Additionally, or alternatively, the key rotation service 130 may transmit the message to the message gateway 136 to be forwarded to one or more client devices via another messaging channel, such as a short message service (SMS) channel or an email channel.

As shown in FIG. 1B, the first party system 102 may include a first party secure message service application 142 (e.g., which may be executed on a client device or server that is to perform XDS). The first party secure message service application 142 may include a payload encryptor utility 144, which includes a cache 146, a signer 148, an encryptor 150, a decryptor 152, and a verifier 154. The first party secure message service application 142 may include a requester 156 and a responder 158. The third party system 104 may include a third party application 160, which includes a requester 162 and a responder 164. As shown by reference number 166, the cache 146 may obtain one or more keys from the key storage 126. For example, the payload encryptor utility 144 may fetch (e.g., request and receive) a first party public key or a first party private key from the key storage 126 for storage in the cache 146. Additionally, or alternatively, the payload encryptor utility 144 may fetch a third party public key from the key storage 126 for storage in the cache 146. In some implementations, the payload encryptor utility 144 may fetch one or more keys on a periodic basis. For example, the payload encryptor utility 144 may fetch the one or more keys based on a configured timing. Additionally, or alternatively, the payload encryptor utility 144 may fetch the one or more keys on an event-driven basis.

As further shown in FIG. 1B, and by reference number 168, the requester 156 may receive a request for secure communication (e.g., external data share) via a secure communication service (e.g., using a key) provided by the first party system 102. For example, the requester 156 may receive a request to transmit one or more datasets, stored on the first party system 102, to the third party system 104. The requester 156 may perform one or more initial pre-processing procedures. For example, the requester 156 may generate a message that includes a payload with the one or more datasets. In some implementations, the requester 156 may determine a set of compliance requirements. For example, the requester 156 may determine a key that is to be used for messages with the third party system 104.

The requester 156 may cause the signer 148 to sign the message and the encryptor to encrypt the message. The signer 148 may sign the message using a first party system private key stored in the cache 146, thereby generating a signed message. The encryptor 150 may encrypt or scramble the signed request using a third party system public key stored in the cache 146, thereby generating a signed and encrypted message. The requester 156 may perform one or more post-processing procedures on the signed and encrypted message, such as adding header data or determining a target system (e.g., the third party application 160 and/or a client device on which the third party application 160 is being executed) for transmitting the signed and encrypted message.

As further shown in FIG. 1B, and by reference number 170, the first party secure message service application 142 causes the signed and encrypted message to be transmitted to the third party application 160 (e.g., via a gateway device, such as a third party gateway device). For example, the first party secure message service application 142 may transmit the signed and encrypted message in a request payload, which is posted to the third party application 160 via a third party gateway device. In some implementations, the first party secure message service application 142 may transmit an authentication token in a header. For example, the first party secure message service application 142 may generate a header for the signed and encrypted message and may include an authentication token in the header to identify the request payload at the third party application 160.

As further shown in FIG. 1B, and by reference number 170, the requester 162 may receive the signed and encrypted message and may trigger the responder 164 to generate a response. In some implementations, the requester 162 may decrypt the signed and encrypted message in the request payload. For example, the requester 162 may use a third party private key to decrypt the signed and encrypted message (e.g., which was encrypted using a corresponding third party public key), thereby recovering the signed message. Additionally, or alternatively, the requester 162 may verify a signature on the signed message. For example, the requester 162 may use a first party system public key (e.g., obtained from the key endpoint 132, shown in FIG. 1A) to verify a signature on the signed message, thereby recovering the message. Additionally, or alternatively, the requester 162 may verify an authentication token in a header of the signed and encrypted message. For example, to verify that the request is genuine (and trigger decryption), the requester 162 may verify that the authentication token, used by the first party secure message service application 142, is genuine. In some implementations, the first party system 102 and/or the third party system 104 may use a particular quantity of keypairs. For example, the first party system 102 and third party system 104 may use multiple sets of keypairs, in which different key pairs are used for a signing operation and an encryption operation (and corresponding decryption operations and signature verification operations) of a request message and/or a response message. Additionally, or alternatively, the first party system 102 and the third party system 104 may use a single keypair for signing and/or encryption (and corresponding decryption and signature verification) of a request message and/or a response message, thereby streamlining key management and enhancing operational efficiency.

As further shown in FIG. 1B, and by reference numbers 172 and 174, the responder 158 may receive a signed and encrypted message from the responder 164. For example, based on the third party application 160 receiving the request payload, the third party application 160 may generate a response message and may sign and encrypt the response message. The responder 158 may perform pre-processing on the received, signed, and encrypted response message and may provide the signed and encrypted response message to the decryptor 152 and the verifier 154. The decryptor 152 and the verifier 154 may use one or more keys to decrypt the encrypted and signed response message and to verify a signature on the encrypted and signed response message. In some implementations, the decryptor 152 and/or the verifier 154 may use a primary key and/or a backup key for decryption. For example, the decryptor 152 may attempt to decrypt the encrypted response message using a currently configured key. When decryption using the currently configured key fails, the decryptor 152 may use a backup key (e.g., a key that has been rotated out but which remains valid, as described above). In this case, the decryptor 152 may attempt to decrypt the encrypted response message using the backup key. The backup key may be successful for decryption when a corresponding backup key has been used for encryption. The third party system 104 may use the corresponding backup key for encryption when the third party system 104 has not received an update with a currently configured key (or has not disseminated the update to a client device on which the third party application 160 is operating).

As indicated above, FIGS. 1A-1B are provided as an example. Other examples may differ from what is described with regard to FIGS. 1A-1B.

Figure 2:
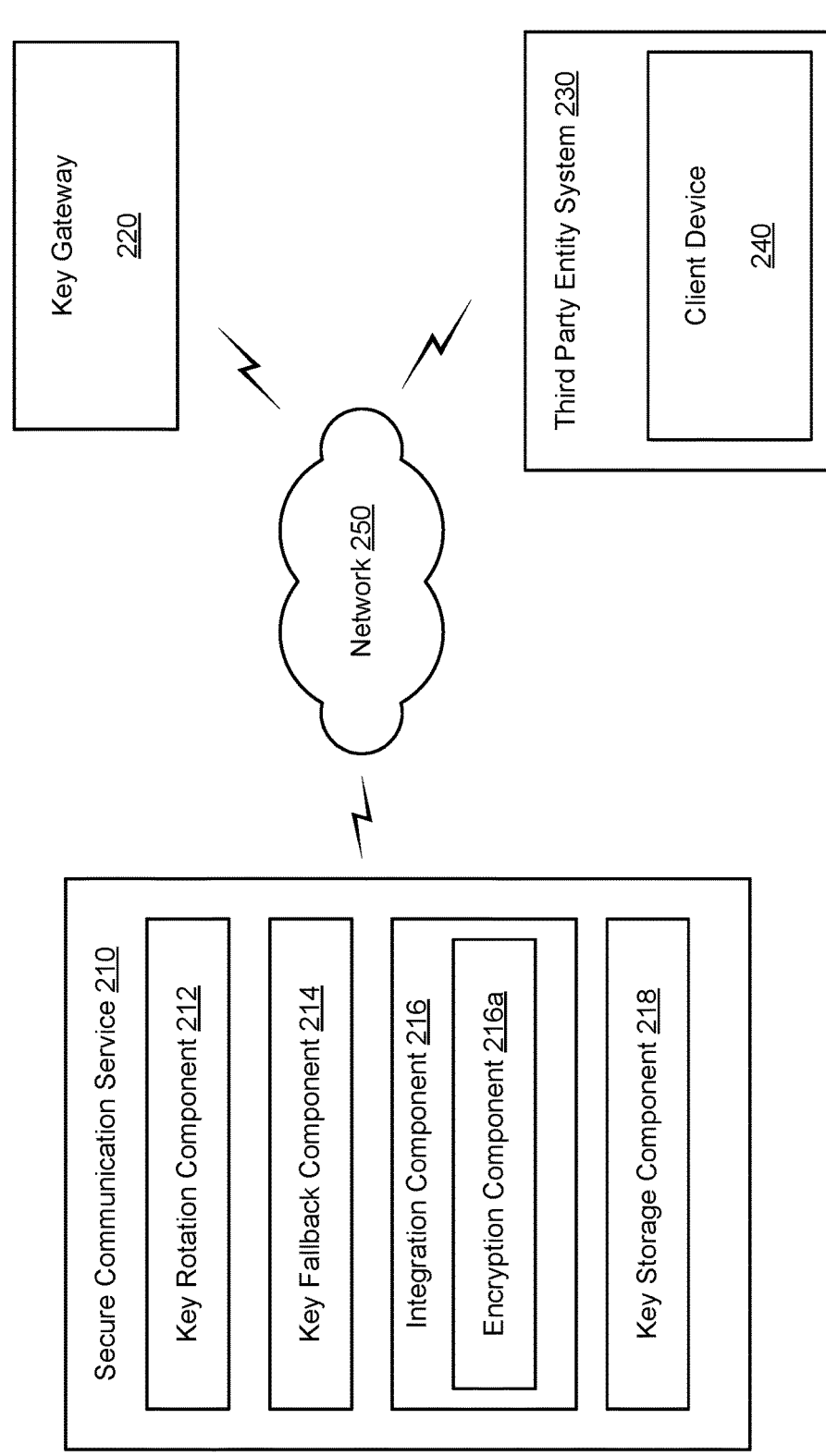
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a secure communication service 210, a key gateway 220, a third party entity system 230, client device 240, and a network 250. Devices of environment 200 may interconnect via wired connections, wireless connections, or a combination of wired and wireless connections.

The secure communication service 210 may include one or more devices capable of receiving, generating, storing, processing, providing, and/or routing information associated with secure communications, as described elsewhere herein. The secure communication service 210 may include a communication device and/or a computing device. For example, the secure communication service 210 may include a server, such as an application server, a client server, a web server, a database server, a host server, a proxy server, a virtual server (e.g., executing on computing hardware), or a server in a cloud computing system. In some implementations, the secure communication service 210 may include an application executing on a server, a client device, or another type of device. For example, the secure communication service 210 may be an application that provides secure communication between a set of client devices 240. Additionally, or alternatively, the secure communication service 210 may include an application on a server that provides secure communications between the server and another server or a client device 240. In some implementations, the secure communication service 210 may include computing hardware used in a cloud computing environment. In some implementations, the secure communication service 210 may correspond to the first party system 102 and/or the first party secure message service application 142 thereof, as described in more detail with regard to FIGS. 1A-1B.

The secure communication service 210 may include a key rotation component 212, which is configured to perform a key rotation operation. For example, the key rotation component 212 may determine whether to rotate a key (e.g., generate a new key and cause a previous key to become a fallback key). In some implementations, the key rotation component 212 may transmit a set of notifications indicating an occurrence of a key rotation event, a generation of a new key, a key becoming a fallback key, or a key becoming invalid. The secure communication service 210 may include a key fallback component 214, which may maintain a fallback key. For example, the key fallback component 214 may store one or more keys, which have been generated previously (e.g., prior to a current key), but which are still valid for encrypting or decrypting a communication. The secure communication service 210 may include an integration component 216, which includes an encryption component 216*a*. The integration component 216 and the encryption component 216*a* may receive requests for secure communication and may encrypt or decrypt messages at a message level for the secure communication. Message level encryption may include encryption of a payload rather than individual data fields thereof. The secure communication service 210 may include a key storage component 218, which may securely store one or more keys, such as a current key or a fallback key. The key storage component 218 may implement one or more encryption or security procedures for protecting one or more keys therein.

The key gateway 220 may include one or more devices capable of receiving, generating, storing, processing, providing, and/or routing information associated with a key for secure communications, as described elsewhere herein. The key gateway 220 may include a communication device and/or a computing device. For example, the key gateway 220 may include a server, such as an application server, a client server, a web server, a database server, a host server, a proxy server, a virtual server (e.g., executing on computing hardware), or a server in a cloud computing system. In some implementations, the key gateway 220 may include computing hardware used in a cloud computing environment.

The third party entity system 230 may include one or more devices capable of receiving, generating, storing, processing, providing, and/or routing information associated with secure communications, as described elsewhere herein. The third party entity system 230 may include a system that includes a set of communication devices and/or a set of computing devices. For example, the third party entity system 230 may include a server, such as an application server, a client server, a web server, a database server, a host server, a proxy server, a virtual server (e.g., executing on computing hardware), or a server in a cloud computing system. In some implementations, the third party entity system 230 may include computing hardware used in a cloud computing environment.

The client device 240 may include one or more devices capable of receiving, generating, storing, processing, and/or providing information associated with secure communications, as described elsewhere herein. The client device 240 may include a communication device and/or a computing device. For example, the client device 240 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
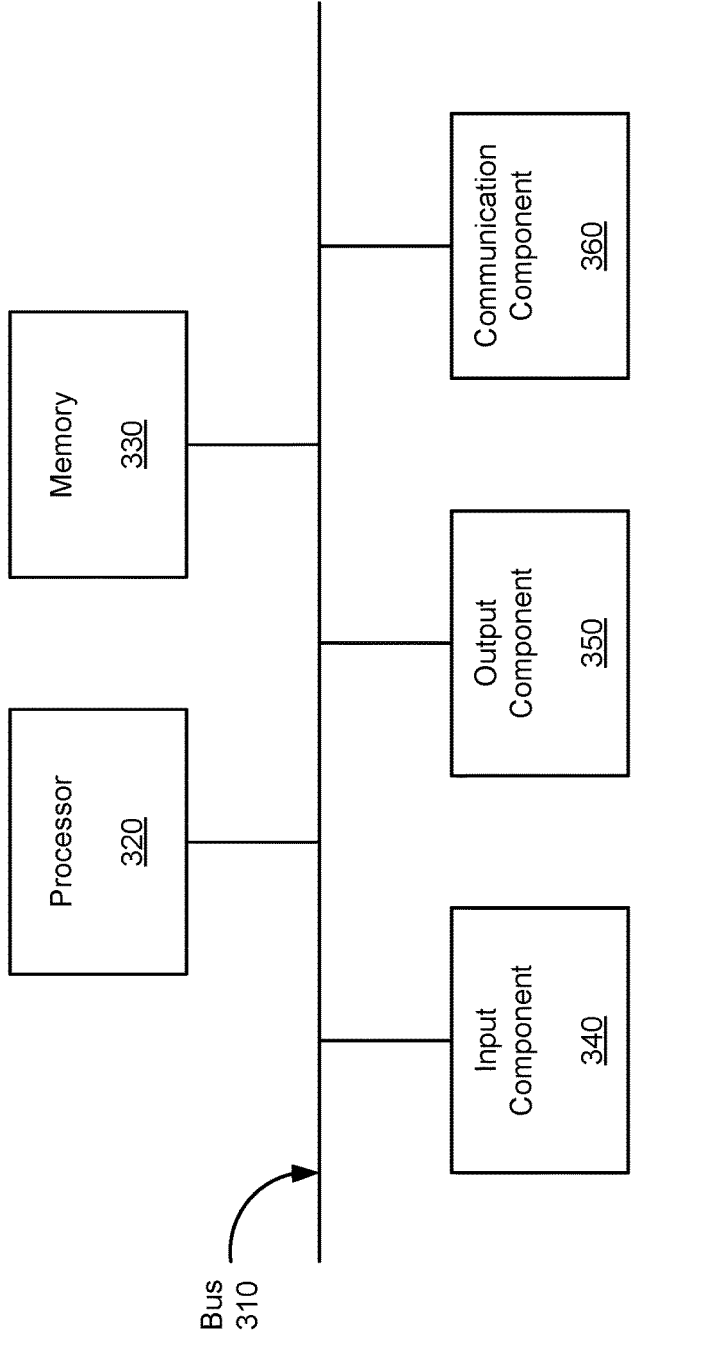
FIG. 3 is a diagram of example components of a device associated with payload level encryption, in accordance with some embodiments of the present disclosure.

FIG. 3 is a diagram of example components of a device 300 associated with payload level encryption. The device 300 may correspond to secure communication service 210, key gateway 220, third party entity system 230, and/or client device 240. In some implementations, secure communication service 210, key gateway 220, third party entity system 230, and/or client device 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with payload level encryption. In some implementations, one or more process blocks of FIG. 4 may be performed by the secure communication service 210. In some implementations, one or more process blocks of FIG. 4 may be performed by another device or a group of devices separate from or including the secure communication service 210, such as the key gateway 220, the third party entity system 230, and/or the client device 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include configuring, for a third party entity, a set of compliance requirements for a secure communication service (block 410). For example, the secure communication service 210 (e.g., using processor 320 and/or memory 330) may configure, for a third party entity, a set of compliance requirements for a secure communication service, as described above in connection with reference number 120 of FIG. 1A. As an example, the secure communication service 210 may configure a set of compliance requirements with the third party entity system 230, such as configuring a set of access permissions, a key rotation frequency, a key backup utilization, a logging configuration, a data retention configuration, or another parameter relating to compliance.

As further shown in FIG. 4, process 400 may include configuring, based on the set of compliance requirements, a key rotation component and a key fallback component for the third party entity (block 420). For example, the secure communication service 210 (e.g., using processor 320 and/or memory 330) may configure, based on the set of compliance requirements, a key rotation component and a key fallback component for the third party entity, as described above in connection with reference numbers 120 and 128 of FIG. 1A. As an example, the secure communication service 210 may configure one or more parameters associated with key rotation, such as a frequency of key rotation or a quantity of fallback keys, among other examples. By providing usage of one or more fallback keys, the secure communication service 210 reduces a likelihood of communication interruptions.

As further shown in FIG. 4, process 400 may include storing a key, generated by the key rotation component, using a key store (block 430). For example, the secure communication service 210 (e.g., using processor 320 and/or memory 330) may store a key, generated by the key rotation component, using a key store, as described above in connection with reference numbers 120 and 128 of FIG. 1A. As an example, the secure communication service 210 may store one or more keys at the secure communication service 210 and/or transmit information identifying one or more keys to the third party entity system 230 for distribution to one or more client devices 240.

As further shown in FIG. 4, process 400 may include periodically updating, using the key rotation component, the key in the key store in accordance with the set of compliance requirements (block 440). For example, the secure communication service 210 (e.g., using processor 320 and/or memory 330) may periodically update, using the key rotation component, the key in the key store in accordance with the set of compliance requirements, as described above in connection with reference number 128 of FIG. 1A. As an example, the secure communication service 210 may periodically update a key and/or a fallback key and store the updated key and/or fallback key via a memory or by transmitting the updated key and/or fallback key to the third party entity system 230 for distribution to one or more client devices 240.

As further shown in FIG. 4, process 400 may include maintaining, in connection with periodically updating the key, at least one fallback key using the key fallback component (block 450). For example, the secure communication service 210 (e.g., using processor 320 and/or memory 330) may maintain, in connection with periodically updating the key, at least one fallback key using the key fallback component, as described above in connection with reference number 128 of FIG. 1A. As an example, the secure communication service 210 may periodically update a key and/or a fallback key and may store and/or distribute the key and/or the fallback key.

As further shown in FIG. 4, process 400 may include receiving a request for a communication using the key (block 460). For example, the secure communication service 210 (e.g., using processor 320, memory 330, input component 340, and/or communication component 360) may receive a request for a communication using the key, as described above in connection with reference number 168 of FIG. 1B. As an example, the secure communication service 210 may receive, from an application, a request to transmit a message using secure communication.

As further shown in FIG. 4, process 400 may include determining, using the key rotation component or the key fallback component, whether the key is a valid current key or a valid fallback key (block 470). For example, the secure communication service 210 (e.g., using processor 320 and/or memory 330) may determine, using the key rotation component or the key fallback component, whether the key is a valid current key or a valid fallback key, as described above in connection with reference numbers 170 and 174 of FIG. 1B. As an example, the secure communication service 210 may attempt to decrypt a communication using a key or fallback key.

As further shown in FIG. 4, process 400 may include communicating using the key based on determining whether the key is the valid current key or the valid fallback key (block 480). For example, the secure communication service 210 (e.g., using processor 320 and/or memory 330) may communicate using the key based on determining whether the key is the valid current key or the valid fallback key, as described above in connection with reference number 170 and 174 of FIG. 1B. As an example, the secure communication service 210 may successfully encrypt or decrypt a communication using a key or fallback key.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1B. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for secure communication, the system comprising:
    one or more memories; and
    one or more processors, communicatively coupled to the
        one or more memories, configured to:

receive, from a client device of a third party entity, a request for secure communication service;

determine, for the third party entity and based on the request for secure communication service, a set of compliance requirements;

configure, for the third party entity and based on the set of compliance requirements, a key rotation component and a key fallback component;

transmit, to the client device, information identifying a key generated by the key rotation component;

periodically update, using the key rotation component, the key in accordance with the set of compliance requirements;

maintain, in connection with periodically updating the key, at least one fallback key using the key fallback component;

receive, from the client device, a request for a communication using the key;

determine, using the key rotation component and the key fallback component, whether the key is a valid current key or a valid fallback key; and communicate with the client device using the key based on determining whether the key is the valid current key or the valid fallback key.

2. The system of claim 1, wherein the one or more processors are further configured to:

determine one or more characteristics of data in the communication;

select, based on the one or more characteristics of the data, an encryption algorithm from a set of possible encryption algorithms; and wherein the one or more processors, to communicate with the client device, are configured to:

communicate with the client device using the encryption algorithm.

3. The system of claim 2, wherein the one or more characteristics includes at least one of:

a type of the data, a size of the data, or a security level associated with the data.

4. The system of claim 2, wherein the one or more processors, to select the encryption algorithm, are configured to:

select the encryption algorithm based on the set of compliance requirements.

5. The system of claim 1, wherein the one or more processors are further configured to:

detect, using the key rotation component, a key rotation event;

identify a set of key users, of the third party entity, subject to the key rotation event; and transmit a set of alerts indicating the key rotation event.

6. The system of claim 1, wherein the one or more processors, to transmit information identifying the key, are configured to:

store the key in a gateway device; and transmit information indicating that the key is being stored in the gateway device.

7. A method, comprising:

configuring, by a system and for a third party entity, a set of compliance requirements for a secure communication service;

configuring, by the system and based on the set of compliance requirements, a key rotation component and a key fallback component for the third party entity;

storing, by the system, a key, generated by the key rotation component, using a key store;

periodically updating, by the system and using the key rotation component, the key in the key store in accordance with the set of compliance requirements;

maintaining, by the system and in connection with periodically updating the key, at least one fallback key using the key fallback component;

receiving, by the system, a request for a communication using the key;

determining, by the system and using the key rotation component or the key fallback component, whether the key is a valid current key or a valid fallback key; and communicating, by the system, using the key based on determining whether the key is the valid current key or the valid fallback key.

8. The method of claim 7, further comprising:

retrieving an external key from the third party entity; and wherein communicating comprises:

communicating using the external key.

9. The method of claim 7, wherein communicating using the key comprises:

using the key for a signing operation.

10. The method of claim 7, wherein communicating using the key comprises:

using the key for an encryption operation.

11. The method of claim 7, further comprising:

determining one or more characteristics of data in the communication;

selecting, based on the one or more characteristics of the data, an encryption algorithm from a set of possible encryption algorithms; and wherein communicating comprises:

communicating using the encryption algorithm.

12. The method of claim 11, wherein the one or more characteristics includes at least one of:

a type of the data, a size of the data, or a security level associated with the data.

13. The method of claim 11, wherein selecting the encryption algorithm comprises:

selecting the encryption algorithm based on the set of compliance requirements.

14. The method of claim 7, further comprising:

detecting, using the key rotation component, a key rotation event;

identifying a set of key users, of the third party entity, subject to the key rotation event; and transmitting a set of alerts indicating the key rotation event.

15. A non-transitory computer-readable medium storing a set of instructions, the set of instructions comprising:

one or more instructions that, when executed by one or more processors of a system, cause the system to:

receive, from a client device of a third party entity, a request for secure communication service;

determine, for the third party entity and based on the request for secure communication service, a set of compliance requirements;

configure, for the third party entity and based on the set of compliance requirements, key rotation for a first party public key/private key pair and a third party public key/private key pair;

transmit, to the client device, information identifying a first party public key of the first party public key/private key pair;

periodically update, using the key rotation, the first party public key/private key pair in accordance with the set of compliance requirements;

maintain, in connection with periodically updating the first party public key/private key pair, at least one fallback key;

receive, from the client device, a request for a communication using the first party public key/private key pair and the third party public key/private key pair; and communicate with the client device using the first party public key/private key pair and the third party public key/private key pair.

16. The non-transitory computer-readable medium of claim 15, wherein the one or more instructions further cause the system to:

determine one or more characteristics of data in the communication;

select, based on the one or more characteristics of the data, an encryption algorithm from a set of possible encryption algorithms; and wherein the one or more instructions, that cause the system to communicate with the client device, cause the system to:

communicate with the client device using the encryption algorithm.

17. The non-transitory computer-readable medium of claim 16, wherein the one or more characteristics includes at least one of:

a type of the data, a size of the data, or a security level associated with the data.

18. The non-transitory computer-readable medium of claim 16, wherein the one or more instructions, that cause the system to select the encryption algorithm, cause the system to:

select the encryption algorithm based on the set of compliance requirements.

19. The non-transitory computer-readable medium of claim 15, wherein the one or more instructions, that cause the system to communicate with the client device, cause the system to:

use the first party public key/private key pair and the third party public key/private key pair for a signing operation.

20. The non-transitory computer-readable medium of claim 15, wherein the one or more instructions, that cause the system to communicate with the client device, cause the system to:

use the first party public key/private key pair and the third party public key/private key pair for an encryption operation.

* * * * *